United States Patent [19]

Ohkuma

[11] Patent Number: 5,374,925
[45] Date of Patent: Dec. 20, 1994

[54] SELECTIVE CALL RECEIVING APPARATUS WITH MESSAGE SORTING FUNCTION

[75] Inventor: Naoya Ohkuma, Yokohama, Japan

[73] Assignee: Matsushita Electric Industrial Co., Ltd., Osaka, Japan

[21] Appl. No.: 969,945

[22] Filed: Oct. 28, 1992

Related U.S. Application Data

[63] Continuation-in-part of Ser. No. 619,351, Nov. 28, 1990, abandoned.

[30] Foreign Application Priority Data

Dec. 5, 1989 [JP] Japan ................................. 1-316131

[51] Int. Cl.⁵ ............................................. H04Q 7/00
[52] U.S. Cl. .............................. 340/825.44; 340/825.27
[58] Field of Search ................. 340/825.44, 825.26, 340/825.27, 311.1; 455/38.2, 38.4

[56] References Cited

U.S. PATENT DOCUMENTS

| | | | |
|---|---|---|---|
| 4,473,824 | 9/1984 | Claytor | 340/825.27 |
| 4,845,491 | 7/1989 | Fascenda et al. | 340/825.44 |
| 5,025,252 | 6/1991 | DeLuca et al. | 340/825.44 |
| 5,049,874 | 9/1991 | Ishida et al. | 340/825.44 |
| 5,075,684 | 12/1991 | DeLuca | 340/825.44 |
| 5,173,688 | 12/1992 | DeLuca et al. | 340/825.44 |

*Primary Examiner*—Michael Horabik
*Assistant Examiner*—Edwin C. Holloway, III
*Attorney, Agent, or Firm*—Lowe, Price, LeBlanc & Becker

[57] ABSTRACT

A selective call receiving apparatus includes a receiving device for receiving a selective call signal composed of transmitted data containing a call number, a function designation number, and message data. A memory device serves to memorize received message data. A display device serves to indicate the memorized message data. An analyzing device serves to analyze at least part of received message data. A plurality of message data received with respect to a common call number and a common function designation number are sorted into classes according to a result of the analysis by the analyzing device. A control device enables the memory device to memorize only newest message data for each of the classes. The control device enables the display device to indicate memorized contents of the memory device.

14 Claims, 9 Drawing Sheets

| F | N | E | W | | W | O | R | L | D | D | P |
|---|---|---|---|---|---|---|---|---|---|---|---|
| | 1001110 | 1000101 | 1010111 | 0100000 | 1010111 | 1001111 | 1010010 | 1001100 | 1000100 | 0100000 | 1010000 |

| F | T | | | * | * | 3 | 2 | 1 | - | 1 | 2 |
|---|---|---|---|---|---|---|---|---|---|---|---|
| | 1010100 | 0101110 | | 0101010 | 0101010 | 0110011 | 0110010 | 0110001 | 0101101 | 0110001 | 0110010 |

| F | 1 | P | Q |
|---|---|---|---|
| | 0110001 | 1010000 | 1010001 |

| G | M | A | | | 3 | 5 | 5 | 0 | 2 | 3 | |
|---|---|---|---|---|---|---|---|---|---|---|---|
| | 1001101 | 1000001 | 0100000 | 0100000 | 0110011 | 0110101 | 0110101 | 0110000 | 0110010 | 0110011 | |

| H | 6 | 6 | L | A | N | D | M | R | K | |
|---|---|---|---|---|---|---|---|---|---|---|
| | 0110110 | 0110110 | 1001100 | 1000001 | 1001110 | 1000100 | 1001101 | 1010010 | 1001011 | 0100000 |

| H | 2 | 5 | 4 | - | 0 | 4 | 2 |
|---|---|---|---|---|---|---|---|
| | 0110010 | 0110101 | 0110100 | 0101101 | 0110000 | 0110100 | 0110010 |

| I | 5 | 2 | 1 | 3 |
|---|---|---|---|---|
| | 0110101 | 0110010 | 0110001 | 0110011 |

| N | W | E | A | T | H | E | R | | N | E | W | S |
|---|---|---|---|---|---|---|---|---|---|---|---|---|
| | 1010111 | 1000101 | 1000001 | 1010100 | 1001000 | 1000101 | 1010010 | 0100000 | 1001110 | 1000101 | 1010111 | 1010011 |

| N | | | | * | * | 5 | 5 | 5 | - | 0 | 0 | 1 |
|---|---|---|---|---|---|---|---|---|---|---|---|---|
| | 0100000 | 0100000 | 0100000 | 0101010 | 0101010 | 0110101 | 0110101 | 0110101 | 0101101 | 0110000 | 0110000 | 0110001 |

| N | 0 | K | P | | | | | | | | | |
|---|---|---|---|---|---|---|---|---|---|---|---|---|
| | 0110000 | 1001011 | 1010000 | | | | | | | | | |

| O | A | L | | | 6 | 3 | 5 | 2 | 3 | 5 | 1 | 2 |
|---|---|---|---|---|---|---|---|---|---|---|---|---|
| | 1000001 | 1001100 | 0100000 | 0100000 | 0110110 | 0110011 | 0110101 | 0110010 | 0110011 | 0110101 | 0110001 | 0110010 |

| P | 1 | 6 | | M | A | N | D | A | R | I | N | |
|---|---|---|---|---|---|---|---|---|---|---|---|---|
| | 0110001 | 0110110 | 0100000 | 1001101 | 1000001 | 1001110 | 1000100 | 1000001 | 1010010 | 1001001 | 1001110 | 0100000 |

| P | 2 | 3 | 3 | 4 | 9 | 9 | 0 | | | | | |
|---|---|---|---|---|---|---|---|---|---|---|---|---|
| | 0110010 | 0110011 | 0110011 | 0110100 | 0111001 | 0111001 | 0110000 | | | | | |

SELECTIVE CALL RECEIVING APPARATUS WITH MESSAGE SORTING FUNCTION

CROSS-REFERENCES TO RELATED APPLICATIONS

This is a continuation-in-part of U.S. patent application, Ser. No. 619,351, filed on Nov. 28, 1990, now abandoned.

BACKGROUND OF THE INVENTION

1. Field of the Invention

This invention relates to a selective call receiving apparatus capable of receiving selective call radio-wave signals, and receiving and indicating messages of the selective call signals.

2. Description of the Prior Art

In a prior art selective call receiving apparatus, received messages related to a common call (identification) number and a common function designation number are memorized in an order equal to the order of their reception or in an order determined by given priority. In other words, memorized messages related to a common call (identification) number and a common function designation number are not stored according to their types. Thus, in some cases, it takes a long time to search a memorized message of a desired type.

In a general selective calling system, when a message of one type is assigned to a combination of a call number and a function designation number, increasing the number of message types requires a receiver to have many call numbers. The receiver having many call numbers tends to be complicated in structure.

In an advanced selective calling system, message signals transmitted from a central station to receivers contain messages and also control signals of special patterns. In each of the receivers, received and memorized messages are stored in accordance with the control signals. The presence of a control signal increases a time of transmission of a related message signal. With respect to the handling of control signals of special patterns, it is necessary to previously provide complicated rules in the central station and the receivers.

U.S. Pat. No. 4,845,491 to Fascenda et al discloses a pager based information system used to transmit both conventional private messages (using unique pager IDs) and two types of unconventional multi-recipient (M-R) messages (using database IDs and group IDs), all using the conventional POCSAG pager transmission format. Operation of the pager is software controlled through the use of a microprocessor and a RAM. Authority to receive the M-R messages is provided at the time of manufacture (database IDs) or via broadcasts (group IDs). Database type M-R messages are stored in the pager RAM in a hierarchical or tree structure. The software controlled pagers permit the over-the-air modification of the operation of selected pagers, such as the addition or deletion of group IDs and the change in the tree structure of the storage area for the database messages. The pager includes a real time pager clock which is updated by pairs of broadcast time messages, the second having a time correlation for the first.

In the system of U.S. Pat. No. 4,845,491, an M-R syncword is followed by a line header code word including a line header. The line header has database ID bits for indicating the database, memory bank bits for designating which of banks of memory in the RAM is to be used, command bits for identifying the message which follows as a database message, a group message, an add/delete group ID message, or a set clock message, and database memory address bits for identifying the location in the RAM for database messages.

In the system of U.S. Pat. No. 4,845.491, the received codes specify processing a code as either a database message, a group message, a change group message, and a time message, each having its own corresponding address area.

U.S. Pat. No. 5,049,874 to Ishida et al discloses a paging receiver including a receiver main body and a card-like ROM. The receiver main body includes a receiver circuit for receiving a paging signal, reception controllers for ON/OFF containing the receiving circuit on the basis of reception control data, address comparators for checking whether a calling signal received in accordance with a reception control signal is assigned to the receiver, a CPU for fetching a message following the calling signal determined to be assigned to the receiver by the address comparators, a message memory for storing a received message, and a display for displaying the message stored in the message memory. The card-like ROM stores at least a part of the reception control data and supplies the reception control data to at least one of the reception controller and the address comparator. The reception control data includes at least one of a frame number representing a frame to be received, an address for receiving a message, and remaining reception number data representing the number of times capable of receiving contract information.

In the paging receiver of U.S. Pat. No. 5,0,19,874, the CPU checks whether a received address coincides with addresses set in address registers of a first group or addresses set in address registers of a second group. Received address type information, message, and reception time are stored in a normal message memory or a contract information memory in accordance with a result of the check on the received address by the CPU.

SUMMARY OF THE INVENTION

It is an object of this invention to provide an improved selective call receiving apparatus.

This invention features checking or analyzing at least part of received messages, and sorting the received messages into corresponding classes according to results of the checking or analyzing. Thus, in this invention, it is unnecessary to transmit special information in addition to a message for sorting the message.

A first aspect of this invention provides a selective call receiving apparatus comprising means for receiving a selective call signal composed of transmitted data containing a call number, a function designation number, and message data; means for memorizing received message data; means for indicating the memorized message data; means for analyzing at least part of received message data; means for sorting a plurality of message data received with respect to a common call number and a common function designation number into classes according to a result of said analyzing; means for enabling the memorizing means to memorize only newest message data for each of the classes: and means for enabling the indicating means to indicate memorized contents of the memorizing means.

A second aspect of this invention provides a selective call receiving apparatus comprising means for receiving selective call signals each containing a call number and a message; means for accepting received call signals which are received by the receiving means and which have call numbers equal to a predetermined call number; means for analyzing at least parts of messages in the accepted call signals; means for sorting the messages in the accepted call signals into classes according to results of said analyzing; and means for updating a previous message with a new message for each of the classes when the new message is sorted by the sorting means.

A third aspect of this invention provides a selective call receiving apparatus comprising means for receiving a selective call signal containing a call number and a message; means for deciding whether or not the call number in the selective call signal received by the receiving means is equal to a predetermined call number; a memory having segments having different addresses respectively: means for, when the deciding means decides the call number to be equal to the predetermined call number, analyzing at least part of the message in the selective call signal received by the receiving means; means for, when the deciding means decides the call number to be equal to the predetermined call number, determining an address on the basis of a result of said analyzing; means for selecting one of the memory segments which has an address equal to the address determined by the determining means; means for clearing the memory segment selected by the selecting means; and means for, after the clearing means clears the memory segment selected by the selecting means, storing the message into the memory segment selected by the selecting means.

A fourth aspect of this invention provides a selective call receiving apparatus comprising means for receiving a selective call signal containing a call number, a function designation number, and a message; means for deciding whether or not the call number in the selective call signal received by the receiving means is equal to a predetermined call number; a memory having segments having different addresses respectively; means for, when the deciding means decides the call number to be equal to the predetermined call number, analyzing at least part of the message in the selective call signal received by the receiving means; means for, when the deciding means decides the call number to be equal to the predetermined call number, determining an address on the basis of a result of said analyzing and the function designation number in the selective call signal received by the receiving means: means for selecting one of the memory segments which has an address equal to the address determined by the determining means; means for clearing the memory segment selected by the selecting means; and means for, after the clearing means clears the memory segment selected by the selecting means, storing the message into the memory segment selected by the selecting means.

BRIEF DESCRIPTION OF THE DRAWINGS

Figure 4A:
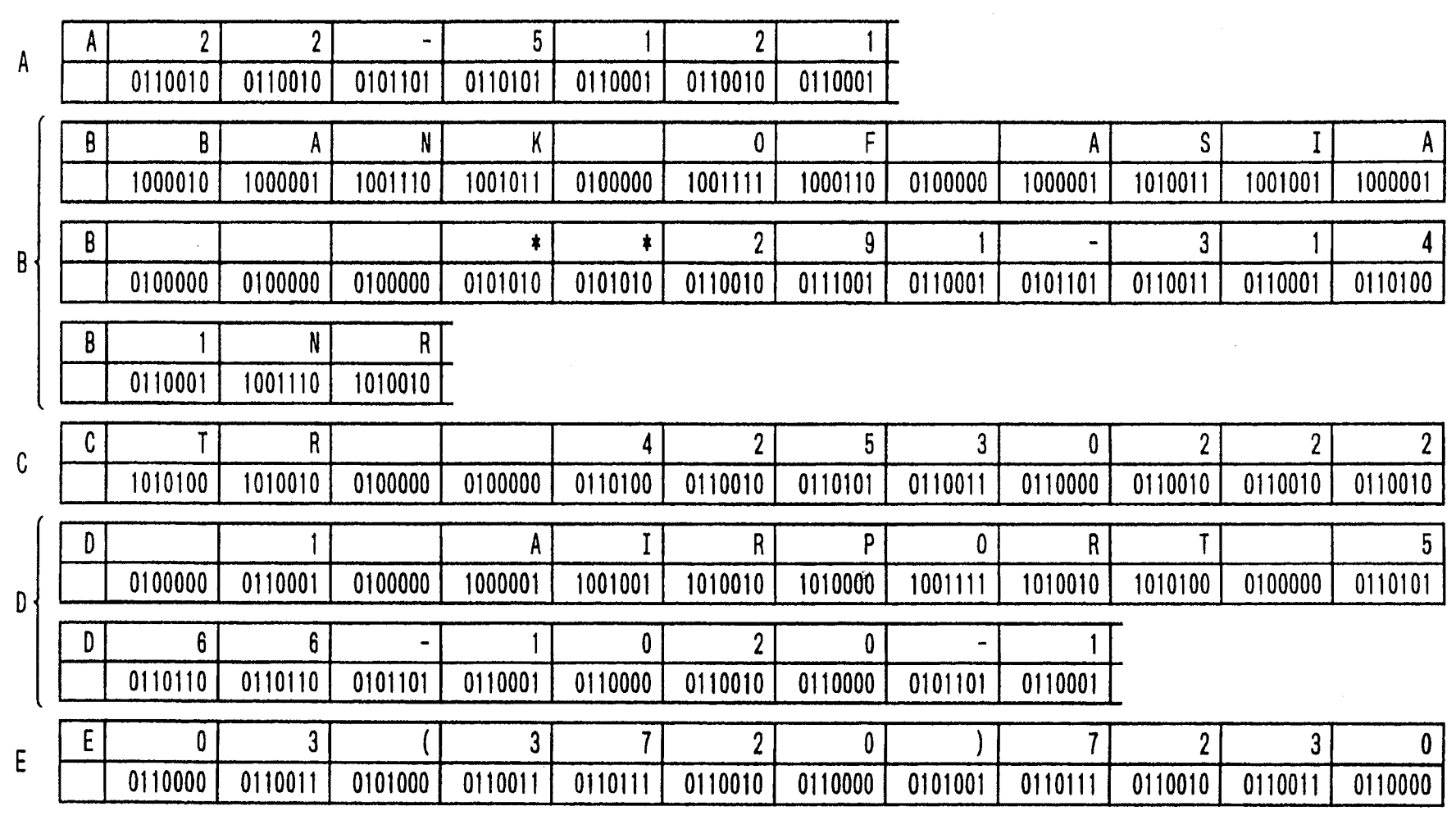
Figure 4C:
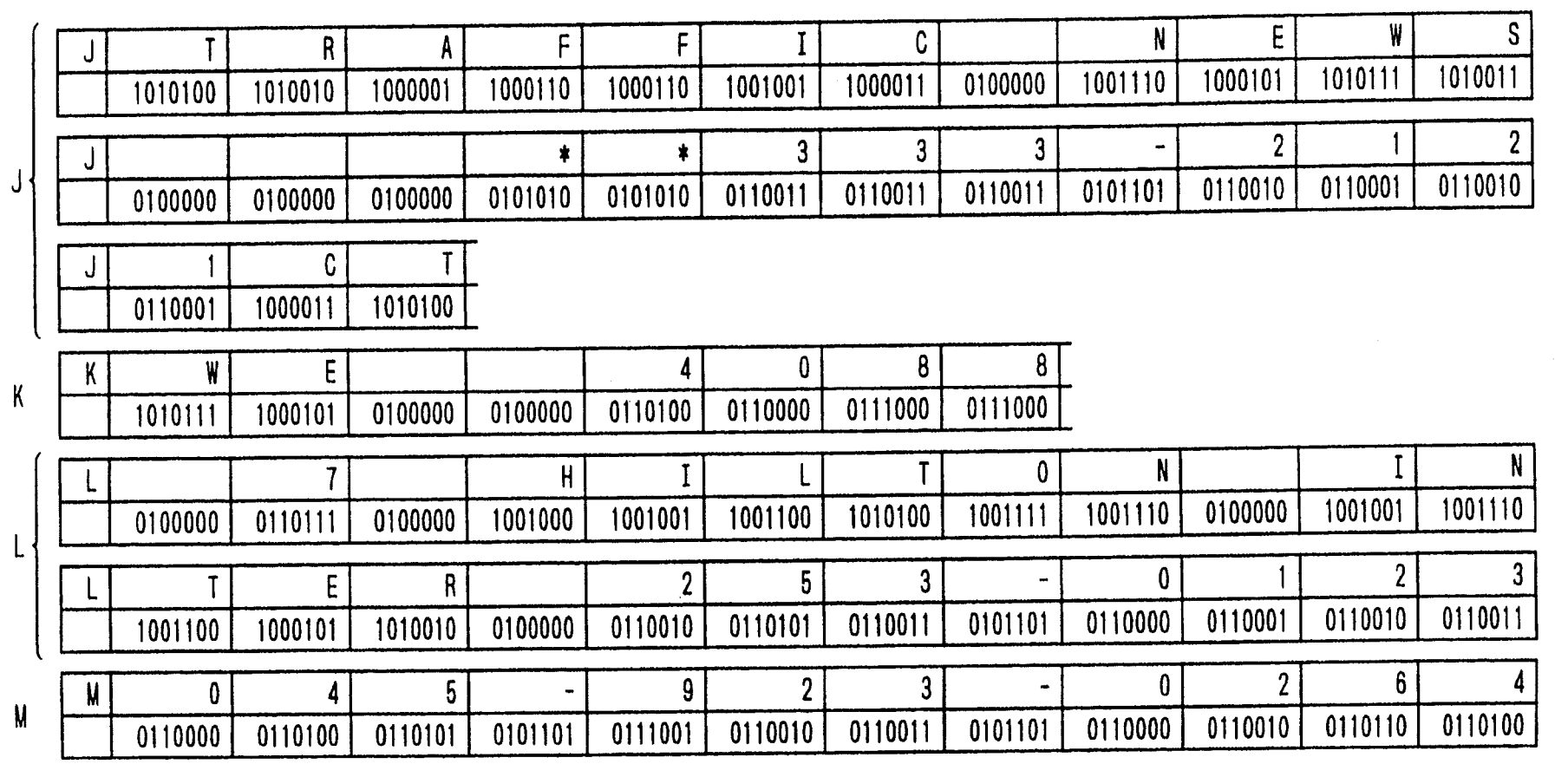

FIGS. 4A, 4B, 4C, and 4D are diagrams showing the contents of messages.

DESCRIPTION OF THE PREFERRED EMBODIMENT

Figure 1:
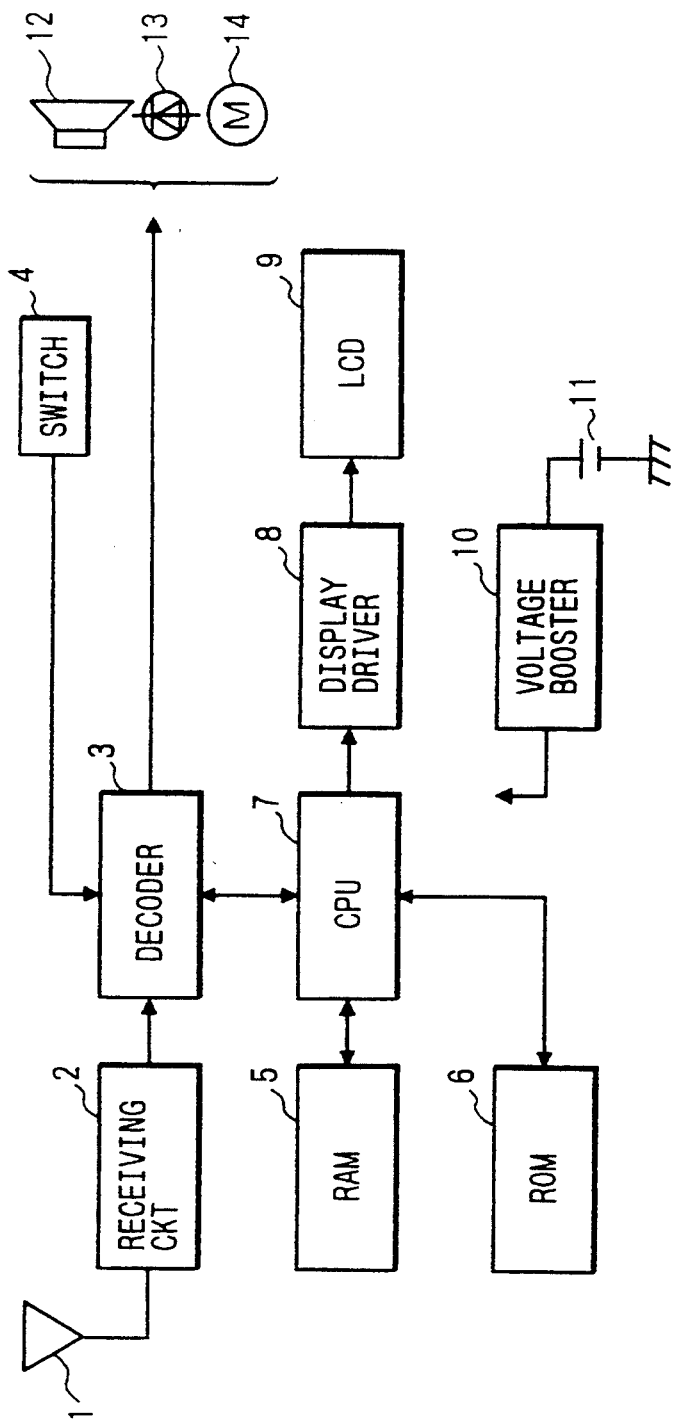
FIG. 1 is a block diagram of a selective call receiving apparatus according to an embodiment of this invention.

FIG. 1 shows a selective call receiving apparatus to which a predetermined call (identification) number is assigned. With reference to FIG. 1, radio waves representing selective call signals are induced in an antenna 1, and are then fed to a receiving circuit 2. The receiving circuit 2 demodulates a received signal from the radio waves. The received signal is fed to a decoder circuit 3. The decoder circuit 3 decodes the received signal into corresponding code words or information referred to as decoded information. Also, the decoder circuit 3 extracts a call number from the decoded information and compares the extracted call number with the predetermined call number. Data representing the predetermined call number is stored in a ROM 6. The data of the predetermined call number is transmitted from the ROM 6 to the decoder circuit 3. An operation switch 4 is connected to the decoder circuit 3.

A CPU 7 connected to the decoder circuit 3 processes received message data and executes other operations in accordance with a program stored in the ROM 6. A RAM 5 connected to the CPU 7 functions to store various data and also received messages. A display driver circuit 8 connected between the CPU 7 and a liquid crystal display (LCD) 9 is controlled by the CPU 7 so that received messages can be indicated on the display 9. A voltage booster 10 such as a dc-dc converter generates a drive voltage from a voltage across a battery 11. The drive voltage is fed from the voltage booster 10 to the devices 2–9 to power them. A loudspeaker 12, a light-emitting diode (LED) 13, and a motor 14 are controlled by the decoder circuit 3. The loudspeaker 12 serves to audibly notify information fed from the decoder circuit 3. The LED 13 serves to visually notify information fed from the decoder circuit 3. The motor 14 is used in notifying information by vibration, the information being fed from the decoder circuit 3.

Figure 2:
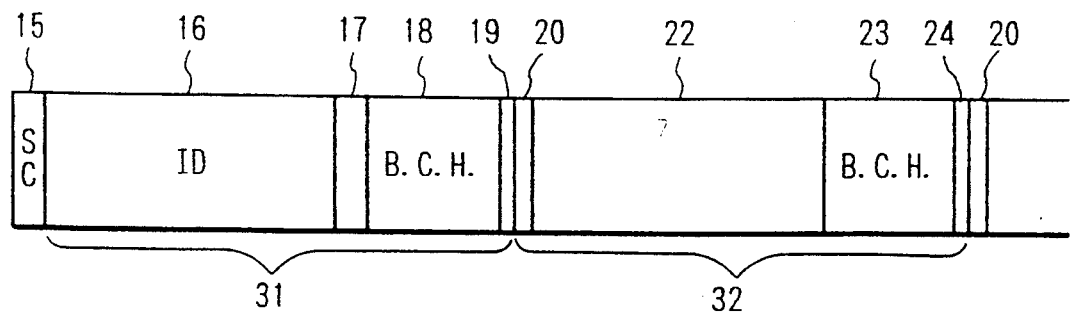
FIG. 2 is a diagram showing the format of data transmission which is used in a selective calling system including the apparatus of FIG. 1.

FIG. 2 shows a format of transmitted selective call signal data which is used in a selective calling system including a selective call receiving apparatus of FIG. 1. As shown in FIG. 2, one block (frame) of transmitted information contains a frame sync signal 15, an address word 31, and message words 32 arranged in the order. The address word 31 has 32 bits. Specifically, the address word 31 has a portion 16 representative of a call number (an identification number: ID), a portion 17 representative of a function designation number, B.C.H. check bits 18, and a parity check bit 19 which are arranged in the order. Also, each message word 32 has 32 bits. Specifically, each message word 32 has a 1-bit message flag 20, a 20-bit message data pack 22, 10 B.C.H. check bits 23, and a parity check bit 24 which are arranged in the order. The 20-bit message data pack represents a part of a transmitted message.

At least two message words 32 successively follow the address part 31, and one block of FIG. 2 has a variable length. As will be described later, messages are of 20 different types denoted by the letters "A" to "P" respectively. The messages "A" to "P" have different bit lengths (bit widths). The message "I" has the smallest length corresponding to 28 bits (7 by 4 bits). The messages "B", "F", "J", and "N" have the greatest length corresponding to 189 bits (7 by 27 bits). The 20 bits of the message data pack 22 in a first message word 32 sequentially represent first to twentieth bits of a transmitted message, and the 20 bits of the message data pack 22 in a second message word 32 sequentially represent twenty-first to fortieth bits of the message. Similarly, the 20 bits of the message data pack 22 in a third or later message word 32 sequentially represent remaining bits of the message. As understood from the above description, two message words 32 are necessary to transmit the shortest message "I" while ten message words 32 are necessary for the longest messages "B", "F", "J", and "N".

A transmitted message is recovered in the selective call receiving apparatus of FIG. 1 as follows. The decoder circuit 3 extracts the message data packs 22 from first and later received message words 32, and subjects the extracted message data packs 22 to error check and correction processes to derive correct message data packs 22. The decoder circuit 3 outputs the correct message data packs 22 to the CPU 7. The CPU 7 combines the bits of the correct message data packs 22 into a complete sequence of bits of a transmitted message to recover the message.

The CPU 7 operates in accordance with a program stored in the ROM 6. When the selective call receiving apparatus of FIG. 1 is activated, the program starts and the CPU 7 operates to feed the data of the predetermined call number from the ROM 6 to the decoder circuit 3 in accordance with an initial part of the program.

A received signal demodulated by the receiving circuit 2 has a part in the format of FIG. 2. The demodulated signal is fed from the receiving circuit 2 to the decoder circuit 3 as NRZ code. The decoder circuit 3 decodes the demodulated signal, and derives a call number 16 and a function designation number 17 in the received signal. The decoder circuit 3 compares the call number in the received signal with the predetermined call number. In cases where the received call number is equal to the predetermined call number, the decoder circuit 3 checks a message flag 20 in the received signal. When the message flag 20 represents the presence of a message, the decoder circuit 3 commands the CPU 7 to execute an interruption process for recovering and sorting a message. The decoder circuit 3 informs the CPU 7 of the function designation number 17. As will be made clear later, the CPU 7 uses the function designation number 17 in a message sorting process.

Figure 3:
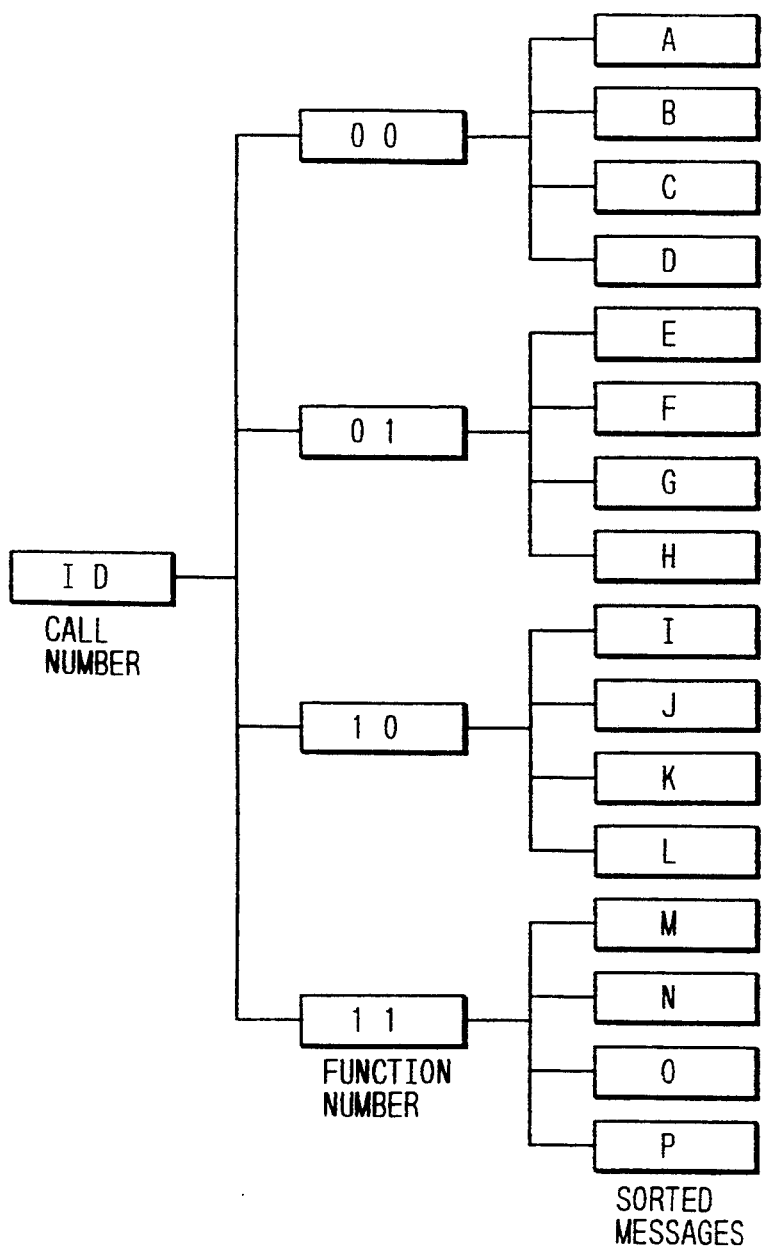
FIG. 3 is a diagram showing the sorting of messages in the apparatus of FIG. 1.

According to a segment of the program which is started by the interruption process, the CPU 7 executes a message recovering process and a message sorting process as follows. First, the CPU 7 fetches data of the function designation number 17 and message data in the message data packs 22 of first and later message words 32 from the decoder circuit 3. The CPU 7 combines the message data in the message data packs 22 into a complete sequence of bits of a transmitted message to recover the message. As shown in FIG. 3, there are four different function designation numbers "00", "01", "10", and "11". Messages are of 16 different types "A" to "P" respectively. The messages "A" to "P" are divided into four groups corresponding to the function designation numbers "00", "01", "10", and "11" respectively. As shown in FIG. 3, the messages "A", "B", "C", and "D" are in a first group corresponding to the function designation number "00". The messages "E", "F", "G", and "H" are in a second group corresponding to the function designation number "01". The messages "I", "J", "K", and "L" are in a third group corresponding to the function designation number "10". The messages "M", "N", "O", and "P" are in a fourth group corresponding to the function designation number "11". The RAM 5 has a message storing part which is divided into 16 segments assigned to 16 types "A" to "P" of messages respectively. As described previously, the CPU 7 is informed of the function designation number 17 of the currently-received message by the decoder circuit 3. The CPU 7 checks or analyzes at least part of the currently-received message, and decides the type of the currently-received message on the basis of the function designation number 17 and the results of the previously-mentioned check or analysis. Then, the CPU 7 stores the currently-received message into the segment of the RAM 5 which is assigned to the decided type of the currently-received message. If the segment of the RAM 5 holds a previous message, the CPU 7 erases the previous message and then stores the currently-received message into the segment of the RAM 5 so that the message in the segment of the RAM 5 is updated. In this way, the sorting of the currently-received message is completed.

When the message sorting is completed, the CPU 7 outputs an answer signal to the decoder circuit 3 to enable the loudspeaker 12, the LED 13, and the motor 14 to execute notifying processes. In addition, the CPU 7 transfers the data of the currently-received message from the RAM 5 to the display driver circuit 8 so that the currently-received message will be indicated on the display 9.

When messages stored in the RAM 5 are required to be indicated, the switch 4 is actuated. The actuation of the switch 4 generates a control signal fed to the decoder circuit 3. In response to this control signal, the decoder circuit 3 commands the CPU 7 to execute a message indicating routine of the program. According to the message indicating routine of the program, the CPU transfers data of all messages from the RAM 5 to the display driver circuit 8 so that the messages will be indicated on the display 9 in an order determined by the order of the message types.

As shown in FIGS. 4A to 4D, the messages "A" to "P" are separated into given numbers of 7-bit segments each representing a character, an alphabetic letter, or a numeral in ASCII code. As will be made clear later, the messages "A" to "P" are divided into four different classes. The messages "A", "E", "I", and "M" are in a first class. The messages "B", "F", "J", and "N" are in a second class. The messages "C", "G", "K", and "O" are in a third class. The messages "D", "H", "L", and "P" are in a fourth class.

In the following description, "=" means a character representing a space which is referred to as a space character. Specifically, the message "A" has 7 segments representing "22-5121". The message "E" has 12 segments representing "03(3720)7230". The message "I" has 4 segments representing "5213". The message M has 12 segments representing "045-923-0264". Thus, the messages "A", "E", "I", and "M" represent only combinations of numerals and characters (2Φ to 3F in ASCII code) in not more than 20 places.

The message "B" has 27 segments representing "BANK=OF=ASIA====291-3141NR". The message "F" has 27 segments representing "NEW=WORLD=DPT..321-1121PQ". The message "J" has 27 segments representing "TRAFFIC=

NEWS====333-2121CT". The message "N" has 27 segments representing "WEATHER= NEWS====555-0010KP". Thus, the messages "B", "F", "J", and "N" have two successive asterisks (*; 2A in ASCII code) in the sixteenth and seventeenth character positions.

The message "C" has 12 segments representing "TR====42530222". The message "G" has 10 segments representing "MA====355023". The message "K" has 8 segments representing "WE====4088". The message "O" has 12 segments representing "AL====63525312". Thus, each of the messages "B", "F", "J", and "N" represents a sequence of two alphabetic letters (41 to 5A in ASCII code), two space characters (2Φ in ASCII code), and numerals (2Φ to 3F in ASCII code).

The message "D" has 21 segments representing "=1=AIRPORT=566-1020-1". The message "H" has 20 segments representing "66==LAND-MARK=254-0424". The message "L" has 24 segments representing "=7=HILTON=IN-TER=253-0123". The message "P" has 19 segments representing "16==MANDARIN=2334990". Thus, each of the messages "D", "H", "L", and "P" represents a sequence of a character and a numeral or two numerals (2Φ to 3F in ASCII code), a space character (2Φ in ASCII code), alphabetic letters (41 to 5A in ASCII code), and numerals and characters.

Figure 5A:
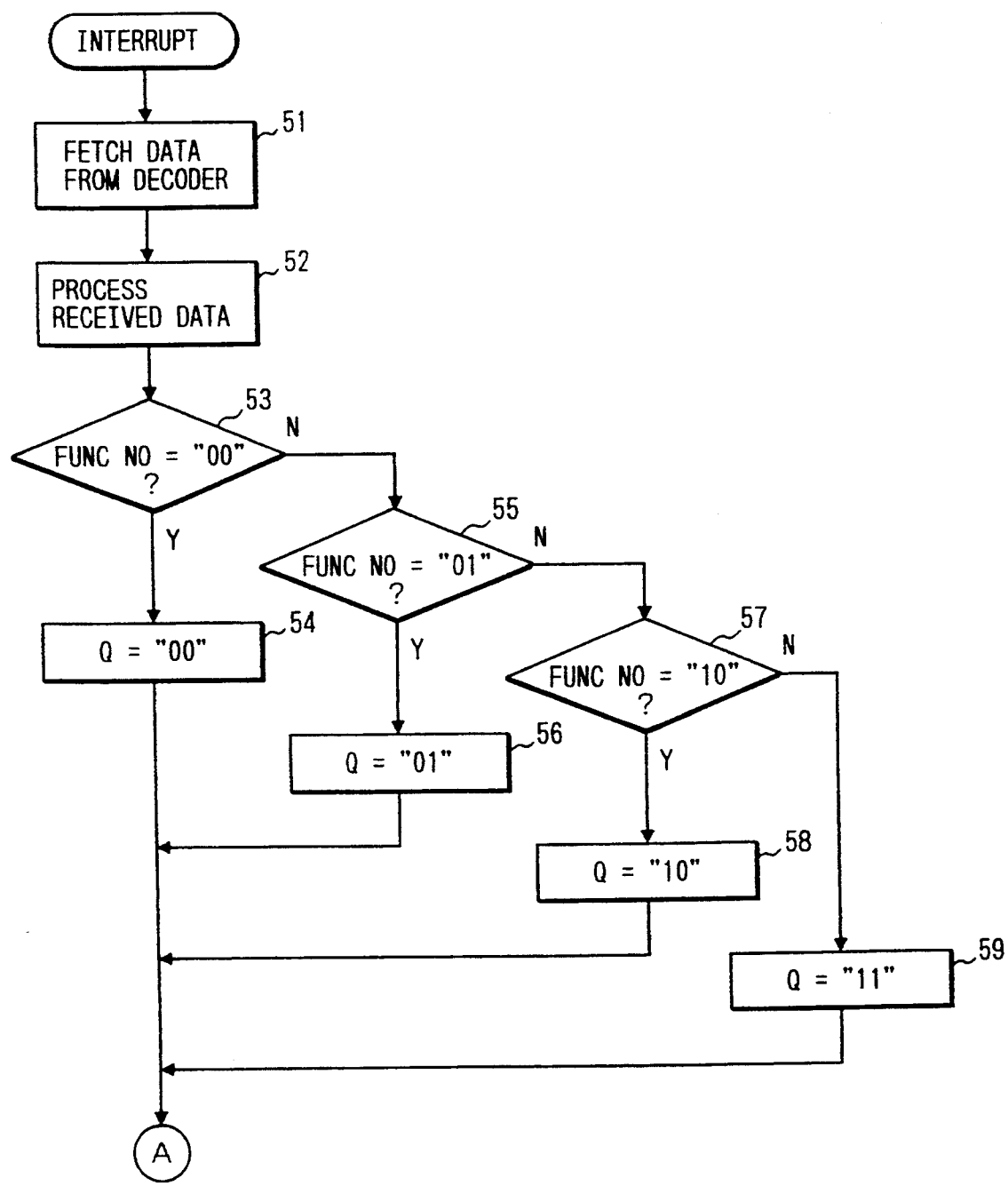
FIGS. 5A, 5B, and 5C are a flowchart of a message recovering and sorting part of a program controlling the CPU of FIG. 1.
Figure 5B:
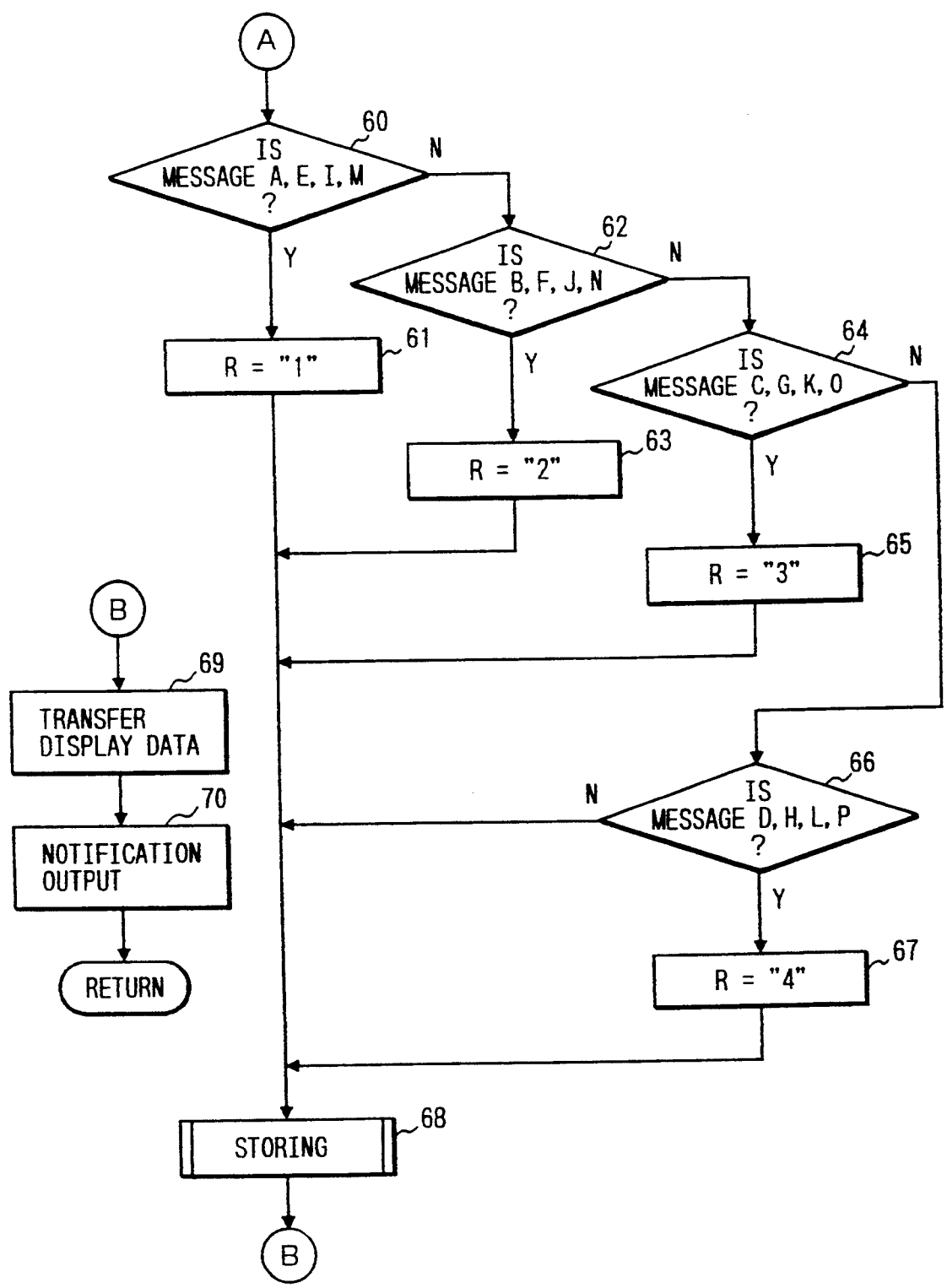
Figure 5C:
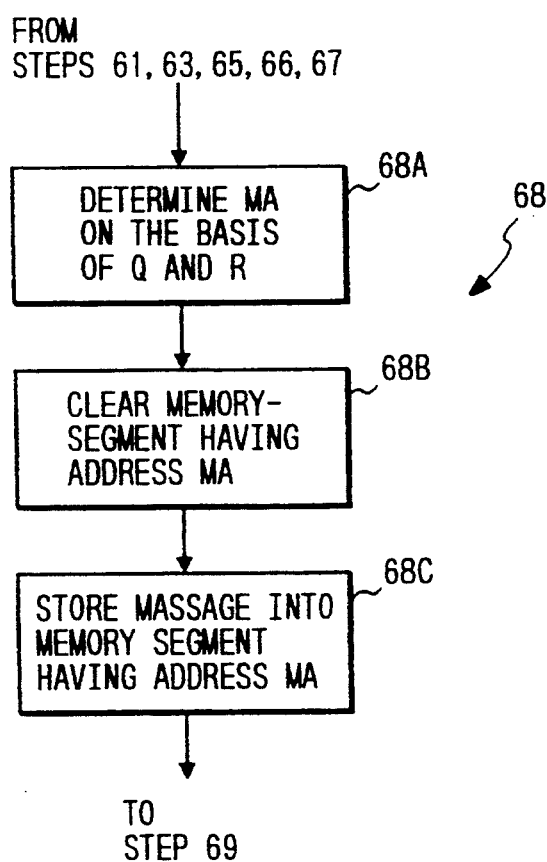

FIGS. 5A, 5B, and 5C show a flowchart of the message recovering and sorting segment of the program which controls the CPU 7. As described previously, the message storing part of the RAM 5 is divided into 16 segments. These 16 memory segments are identified by an address MA changeable among 16 different states "A", "B", ..., "P". In other words, the 16 memory segments have the 16 addresses "A", "B", ..., "P" respectively. As described previously, the message recovering and sorting segment of the program is started by the interruption process.

As shown in FIG. 5A, a first step 51 of the program fetches message data and function designation number data from the decoder circuit 3. A step 52 following the step 51 processes message data. Specifically, the step 52 combines the message data into a complete sequence of bits of a currently-received message to recover the currently-received message. In addition, the step 52 process the function designation number data to derive the function designation number 17 of the currently-received message. A step 53 following the step 52 decides whether or not the function designation number 17 is "00". When the function designation number 17 is decided to be "00", the program advances from the step 53 to a step 54 which sets a first address part Q to "00". When the function designation number 17 is decided to be not "00", the program advances from the step 53 to a step 55. The step 55 decides whether or not the function designation number 17 is "01". When the function designation number 17 is decided to be "01", the program advances from the step 55 to a step 56 which sets the first address part Q to "01". When the function designation number 17 is decided to be not "01", the program advances from the step 55 to a step 57. The step 57 decides whether or not the function designation number 17 is "10". When the function designation number 17 is decided to be "10", the program advances from the step 57 to a step 58 which sets the first address part Q to "10". When the function designation number 17 is decided to be not "10", the program advances from the step 57 to a step 59 which sets the first address part Q to "11". After the steps 54, 56, 58, and 59, the program advances to a step 60.

As shown in FIG. 5B, the step 60 decides whether or not the currently-received message is of one of the types "A", "E", "I", and "M". This decision is executed by determining whether or not the contents of the currently-received message are equal to a combination of only numerals and characters (2Φ to 3F in ASCII code). When the currently-received message is decided to be of one of the types "A", "E", "I", and "M", the program advances from the step 60 to a step 61 which sets a second address part R to "1". When the currently-received message is decided to be not of one of the types "A", "E", "I", and "M", the program advances from the step 60 to a step 62. The step 62 decides whether or not the currently-received message is of one of the types "B", "F", "J", and "N". This decision is executed by determining whether or not asterisks (*; 2A in ASCII code) are present in the sixteenth and seventeenth character positions of the currently-received message. When the currently-received message is decided to be of one of the types "B", "F", "J", and "N", the program advances from the step 62 to a step 63 which sets the second address part R to "2". When the currently-received message is decided to be not of one of the types "B", "F", "J", and "N", the program advances from the step 62 to a step 64. The step 64 decides whether or not the currently-received message is of one of the types "C", "G", "K", and "O". This decision is executed by determining whether or not two alphabetic characters (41 to 5A in ASCII code), two space characters (2Φ in ASCII code), and a numeral (2Φ to 3F in ASCII code) are present in the first, second, third, fourth, and fifth character positions of the currently-received message respectively. When the currently-received message is decided to be of one of the types "C", "G", "K", and "O", the program advances from the step 64 to a step 65 which sets the second address part R to "3". When the currently-received message is decided to be not of one of the types "C", "G", "K", and "O", the program advances from the step 64 to a step 66. The step 66 decides whether or not the currently-received message is of one of the types "D", "H", "L", and "P". This decision is executed by determining whether or not a numeral or a space character (2Φ to 3F in ASCII code), a numeral or a space character (2Φ to 3F in ASCII code), a space character (2Φ in ASCII code), and an alphabetic letter (41 to 5A in ASCII code) are present in the first, second, third, and fourth character positions of the currently-received message respectively. When the currently-received message is decided to be of one of the types "D", "H", "L", and "P", the program advances from the step 66 to a step 67 which sets the second address part R to "4". When the currently-received message is decided to be not of one of the types "D", "H", "L", and "P", the program advances from the step 64 to a message storing block 68. In addition, after the steps 61, 63, and 65, the program advances to the message storing block 68.

As shown in FIG. 5C, a first step 68A of the message storing block 68 determines the memory address MA on the basis of the first address part Q and the second address part R. Specifically: MA="A" when Q="00" and R="1"; MA="B" when Q="00" and R="2"; MA="C" when Q="00" and R="3"; MA="D" when Q="00" and R="4"; MA="E" when Q="01" and R="1"; MA="F" when Q="01" and R="2"; MA="G" when Q="01" and R="3"; MA="H"

when Q="01" and R="4"; MA="I" when Q="10" and R="1"; MA="J" when Q="10" and R="2"; MA="K" when Q="10" and R="3"; MA="L" when Q="10" and R="4"; MA="M" when Q="11" and R="1"; MA="N" when Q="11" and R="2"; MA="O" when Q="11" and R="3"; and MA="P" when Q="11" and R="4". A step 68B following the step 68A clears the memory segment having the memory address MA determined by the step 68A. A step 68C following the step 68B stores the currently-received message into the memory segment having the memory address MA determined by the step 68A. After the step 68C, the program advances to a step 69 of FIG. 5B.

As shown in FIG. 5B, the step 69 outputs the data of the currently-received message to the display driver circuit 8 so that the currently-received message will be indicated on the display 9. A step 70 following the step 69 outputs an answer signal to the decoder circuit 3, enabling the loudspeaker 12, the LED 13, and the motor 14 to execute notifying processes. After the step 70, the interruption process ends and the program returns to the main routine.

What is claimed is:

1. A selective call receiving apparatus comprising:
   means for receiving a selective call signal composed of transmitted data containing a call number, a function designation number, and a sequence of characters representing message data;
   means for memorizing received message data;
   means for indicating the memorized message data;
   means for analyzing an entirety of the received message data;
   means for sorting a plurality of message data received with respect to a common call number and a common function designation number into classes according to a result of said analyzing means;
   means for enabling the memorizing means to memorize only newest message data for each of the classes; and
   means for enabling the indicating means to indicate memorized contents of the memorizing means,
   wherein said analyzing means comprises means for detecting types of characters in the received message data.

2. The apparatus of claim 1, wherein said analyzing means comprises means for determining whether or not a character in a predetermined position in the character sequence representing the message data is of a predetermined type.

3. A selective call receiving apparatus comprising:
   means for receiving selective call signals each containing a call number and a message represented by a sequence of characters;
   means for accepting received call signals which are received by the receiving means and which have call numbers equal to a predetermined call number;
   means for analyzing entire messages in the accepted call signals;
   means for sorting the messages in the accepted call signals into classes according to results of said analyzing means; and
   means for updating a previous message with a new message for each of the classes when the new message is sorted by the sorting means,
   wherein said analyzing means comprises means for detecting types of characters representing the messages.

4. The apparatus of claim 3, further comprising means for indicating the sorted messages sorted by the sorting means.

5. The apparatus of claim 3, wherein said analyzing means comprises means for determining whether or not characters in predetermined positions in character sequences representing the messages are of a predetermined type.

6. A selective call receiving apparatus comprising:
   means for receiving a selective call signal containing a call number and a message represented by a sequence of characters;
   means for deciding whether or not the call number in the selective call signal received by the receiving means is equal to a predetermined call number;
   a memory having segments having different addresses respectively;
   means for, when the deciding means decides the call number to be equal to the predetermined call number, analyzing an entirety of the message in the selective call signal received by the receiving means;
   means for, when the deciding means decides the call number to be equal to the predetermined call number, determining an address on the basis of a result of said analyzing means;
   means for selecting one of the memory segments which has an address equal to the address determined by the determining means;
   means for clearing the memory segment selected by the selecting means; and
   means for, after the clearing means clears the memory segment selected by the selecting means, storing the message into the memory segment selected by the selecting means,
   wherein said analyzing means comprises means for detecting types of characters representing the message.

7. The apparatus of claim 6, further comprising means for reading out messages from the memory segments, and means for indicating the readout messages in a predetermined order.

8. The apparatus of claim 6, wherein said analyzing means comprises means for determining whether or not a character in a predetermined position in a character sequence representing the messages is of a predetermined type.

9. A selective call receiving apparatus comprising:
   means for receiving a selective call signal containing a call number, a function designation number, and a message represented by a sequence of characters;
   means for deciding whether or not the call number in the selective call signal received by the receiving means is equal to a predetermined call number;
   a memory having segments having different addresses respectively;
   means for, when the deciding means decides the call number to be equal to the predetermined call number, analyzing a whole of the message in the selective call signal received by the receiving means;
   means for, when the deciding means decides the call number to be equal to the predetermined call number, determining an address on the basis of a result of said analyzing and the function designation number in the selective call signal received by the receiving means;
   means for selecting one of the memory segments which has an address equal to the address determined by the determining means;

means for clearing the memory segment selected by the selecting means; and means for, after the clearing means clears the memory segment selected by the selecting means, storing the message into the memory segment selected by the selecting means, wherein said analyzing means comprises means for detecting types of characters representing the message.

10. The apparatus of claim 9, further comprising means for reading out messages from the memory segments, and means for indicating the readout messages in a predetermined order.

11. The apparatus of claim 6, wherein said analyzing means comprises means for determining whether or not a character in a predetermined position in a character sequence representing the messages is of a predetermined type.

12. A selective call receiving apparatus comprising:
means for receiving selective call signals each representing a call number and a message having a sequence of characters;
means for accepting call signals which are received by the receiving means and which have call numbers equal to a predetermined call number;
means for detecting whether or not all characters in each message in an accepted call signal are equal to characters of predetermined types;
means for sorting messages in the accepted call signals into message classes according to results of character type detection by said detecting means; and
means for updating a previous message with a new message for each of the message classes when the new message is sorted by the sorting means.

13. A selective call receiving apparatus comprising:
means for receiving selective call signals each representing a call number and a message having a sequence of characters;
means for accepting call signals which are received by the receiving means and which have call numbers equal to a predetermined call number;
means for detecting whether or not a character in a predetermined position of each of a plurality of character sequences, representing a plurality of received messages, is a character of a predetermined type;
means for sorting the plurality of received messages in the accepted call signals into classes according to results of detecting by said detecting means; and
means for updating a previous message with a new message for each of the classes when the new message is sorted by the sorting means.

14. A selective call receiving apparatus comprising:
means for receiving selective call signals each representing a call number and a message, wherein the message is of a type selectable from among a plurality of different types and is exclusive of address information;
means for accepting call signals which are received by the receiving means and which have call numbers equal to a predetermined call number;
means for detecting types of messages in the accepted call signals;
means for sorting messages in the accepted call signals into classes according to the detected types of the messages; and
means for updating a previous message with a new message for each of the classes when the new message is sorted by the sorting means.

* * * * *